United States Patent
Viswanathan et al.

(10) Patent No.: US 10,154,007 B1
(45) Date of Patent: Dec. 11, 2018

(54) ENTERPRISE CLOUD ACCESS CONTROL AND NETWORK ACCESS CONTROL POLICY USING RISK BASED BLOCKING

(71) Applicant: Skyhigh Networks, Inc., Cupertino, CA (US)

(72) Inventors: Surendrakumar Viswanathan, Bangalore (IN); Kaushik Narayan, San Jose, CA (US); Rama Taraniganty, Cupertino, CA (US)

(73) Assignee: Skyhigh Networks, LLC, Campbell, CA (US)

( * ) Notice: Subject to any disclaimer, the term of this patent is extended or adjusted under 35 U.S.C. 154(b) by 476 days.

(21) Appl. No.: 14/705,824

(22) Filed: May 6, 2015

Related U.S. Application Data

(60) Provisional application No. 61/990,595, filed on May 8, 2014, provisional application No. 62/101,310, filed on Jan. 8, 2015.

(51) Int. Cl.
  *H04L 29/06*  (2006.01)

(52) U.S. Cl.
  CPC .......... *H04L 63/02* (2013.01); *H04L 63/0281* (2013.01); *H04L 63/101* (2013.01); *H04L 63/20* (2013.01)

(58) Field of Classification Search
  CPC . H04L 63/1433; H04L 41/50; H04L 41/5022; H04L 41/5058; H04L 41/5096; H04L 63/20; H04L 67/10; G06Q 10/0635
  See application file for complete search history.

(56) References Cited

U.S. PATENT DOCUMENTS

| | | | | |
|---|---|---|---|---|
| 2006/0095955 | A1* | 5/2006 | Vong | H04L 63/101 726/3 |
| 2009/0309709 | A1* | 12/2009 | Bevacqua | B60R 25/102 340/426.18 |
| 2011/0167474 | A1* | 7/2011 | Sinha | G06F 21/51 726/1 |
| 2012/0240183 | A1* | 9/2012 | Sinha | H04W 12/08 726/1 |
| 2012/0265976 | A1* | 10/2012 | Spiers | H04L 63/0218 713/2 |
| 2013/0167231 | A1* | 6/2013 | Raman | H04L 63/1416 726/23 |

(Continued)

*Primary Examiner* — Joseph P Hirl
*Assistant Examiner* — Sayed Aresh Beheshti Shirazi
(74) *Attorney, Agent, or Firm* — Byrne Poh LLP

(57) ABSTRACT

A cloud access control server and method provides a cloud service access control database to implement cloud services access control policy. The cloud service access control database stores thereon cloud service identifiers associated with cloud service providers having high risk scores. In some embodiments, the cloud service identifiers form a block list of cloud services which is provided to network device of the enterprise data network to implement cloud service access control. In other embodiments, a cloud access control server and method implements cloud services access control policy for an enterprise. The cloud access control server and method receives network traffic data from the installed firewall or proxy at the enterprise and process the network traffic data with respect to cloud service access. The cloud access control server provides instructions to the firewall or proxy to allow or deny the network access at the enterprise.

8 Claims, 6 Drawing Sheets

(56) References Cited

U.S. PATENT DOCUMENTS

| | | | | |
|---|---|---|---|---|
| 2014/0137190 A1* | 5/2014 | Carey | ................. | H04L 63/1433 |
| | | | | 726/3 |
| 2014/0282844 A1* | 9/2014 | Devetter | ................. | H04L 63/20 |
| | | | | 726/1 |
| 2015/0319261 A1* | 11/2015 | Lonas | ............... | H04L 367/2852 |
| | | | | 709/216 |
| 2016/0119365 A1* | 4/2016 | Barel | ................. | H04L 63/1408 |
| | | | | 726/12 |
| 2016/0127407 A1* | 5/2016 | Mankovskii | ........ | H04L 63/1433 |
| | | | | 726/1 |

* cited by examiner

ENTERPRISE CLOUD ACCESS CONTROL AND NETWORK ACCESS CONTROL POLICY USING RISK BASED BLOCKING

CROSS REFERENCE TO OTHER APPLICATIONS

This application claims priority to U.S. Provisional Patent Application No. 61/990,595 entitled ENTERPRISE CLOUD ACCESS CONTROL SERVER AND METHOD filed May 8, 2014, and also claims priority to U.S. Provisional Patent Application No. 62/101,310 entitled NETWORK ACCESS CONTROL USING RISK BASED BLOCKING, filed Jan. 8, 2015, which are incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With the proliferation of cloud based services, an enterprise may be employing a large number (e.g. 600 or more) of cloud services in the enterprise's day-to-day operation. Enterprises are finding it difficult to implement access control for the use of cloud-based services. Traditional access control schemes typically do not work well for cloud based services. In general, enterprises install third party firewall or proxy to realize network access control to external websites. The enterprises are thus dependent on the third party firewall or proxy to implement security policies and to decide whether to allow or deny access to certain sites. The third party security policies are usually not specifically tailored for cloud service providers. Furthermore, current network access control schemes are often content driven. That is, the third party firewall or proxy may implement network access control policies to block file sharing or to scan network data for certain sensitive data. Existing security policies implemented by third party firewall or proxy are typically not well adapted for cloud based services.

BRIEF DESCRIPTION OF THE DRAWINGS

Various embodiments of the invention are disclosed in the following detailed description and the accompanying drawings.

DETAILED DESCRIPTION

Figure 1:
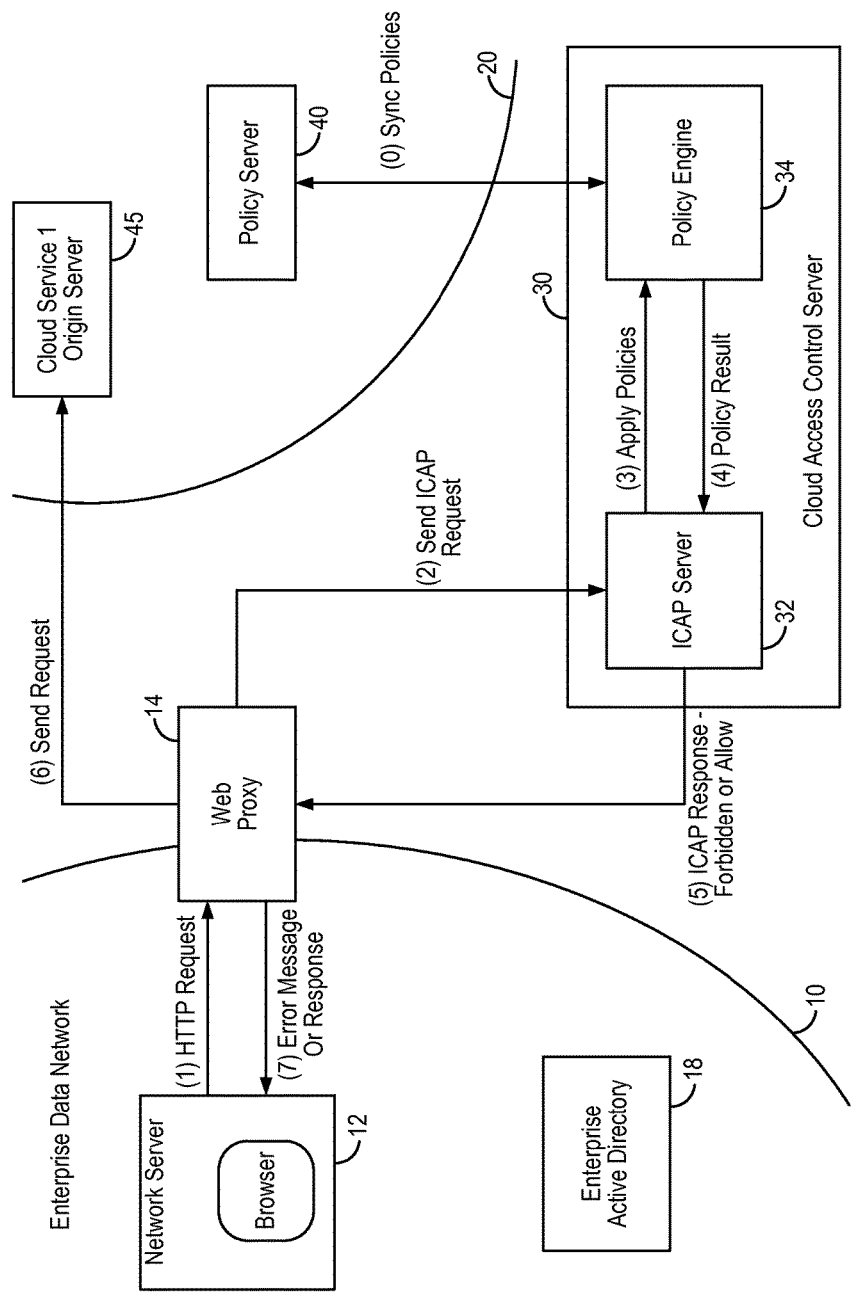
FIG. 1 is a diagram illustrating an environment in which the cloud access control server of the present invention can be deployed in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a cloud access control server and method implements cloud services access control policy for an enterprise based on the risk associated with the cloud service providers and the service category. The cloud access control server and method operates seamlessly with the enterprise's existing network infrastructure to leverage the already installed network infrastructure of an enterprise. In this manner, the enterprise may rely on the cloud access control server and method to provide access control policies that are specific to cloud service providers and that are not merely content based.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" refers to data and content being stored on a cloud-based service. The cloud-based service may be a cloud storage service or other types of cloud services. The cloud content may be stored as data files or in other formats.

In some embodiments, a cloud access control server is in communication with the network devices of an enterprise, such as the firewall or the web proxy of the enterprise, to implement access control policies or security policies specific to cloud service providers. In some embodiments, the cloud access control server implements cloud access control policies that are directed to the cloud service providers and the category of cloud services being provided.

In some embodiments, the cloud access control server receives network traffic data from the installed firewall or proxy at the enterprise and process the network traffic data with respect to cloud service access. After processing the network traffic data with respect to cloud service access control policies, the cloud access control server provides instructions to the firewall or proxy to allow or deny the network access at the enterprise. In other embodiments, the cloud access control server may provide instructions for more granular access control, such as controlling the direction of the network traffic (upload versus download), controlling the rate, encrypting the data or providing warning messages.

In some applications, a system may be configured to perform risk analysis of cloud service providers and to provide a risk score or a risk rating associated with each cloud service provider. An example of a cloud service usage risk assessment system is described in copending and commonly assigned U.S. patent application Ser. No. 14/166,721, entitled "Cloud Service Usage Risk Assessment," of D. Curcic et al., filed Jan. 28, 2014, which patent application is incorporated herein by reference in its entirety. In some embodiments, a cloud service registry is provided to store cloud service provider information and associated risk score associated for each cloud service provider. In some embodiments, the cloud access control server of the present invention implements a cloud service access control policy based on the cloud service risk score associated with the cloud service provider. For example, the cloud service access control policy may limit the enterprise's users to cloud service providers with a risk score of 3 or less. When a user attempts to access a cloud service site with an associated risk score greater than 3, the cloud access control server may deny the access and may further provides a suggested alternate cloud service provider in the same service category with a lower risk score.

FIG. 1 is a diagram illustrating an environment in which the cloud access control server of the present invention can be deployed in some embodiments. Referring to FIG. 1, an enterprise may operate an enterprise data network 10 including one or more network servers 12 and enterprise active directory 18. The enterprise data network 10 includes an enterprise network edge 14, such as a proxy server or a web proxy, which is used to communicate with a public data network 20, such as the publicly accessible Internet. In the present description, a web proxy refers to a network device, such as a proxy server or a gateway, that acts as an intermediary for request for network resources, such as http(s) requests. Users of the enterprise, wishing to access a website outside of the enterprise's data network 10, communicate with the web proxy 14 through the network server 12 using a web browser.

The enterprise or users of the enterprise data network 10 may wish to use one or more cloud services provided by cloud service providers, such as Cloud Service Provider 1. Network traffic form the network server 12 travels to the enterprise network edge 14 and then onto the cloud service providers. For example, users of the enterprise may upload data files or other data content to be stored on one or more cloud services on the public data network 20.

At the enterprise data network 10, the web proxy acts as an intermediary for the entire network traffic, such as http/https traffic, flowing from the enterprise (network server 12) to an outside data network, such as the public Internet. The enterprise usually uses the web proxy 14 for network tasks such as caching, malware analysis etc. The web proxy also communicates with the enterprise administrator for authentication.

In some embodiments, the web proxy 14 has the capability to act as an ICAP (Internet Content Adaption Protocol) client and has the ability to send selective http(s) requests over ICAP to an ICAP server for inspection and control. For example, a secure web gateway, such as the Bluecoat ProxySG appliance, has the capability to send ICAP requests to an ICAP server for selective or all URL categories received from a network server.

In embodiments of the present invention, to implement cloud service access control, the enterprise may employ a cloud access control server 30 to evaluate the network traffic and to determine the level of access for each cloud service providers being used by the enterprise. The cloud access control server 30 is deployed on a data network outside of the enterprise data network 10. In one embodiment, the cloud access control server 30 is deployed on the public data network 20. In other embodiments, the cloud access control server 30 may be deployed on a private data network apart from the enterprise data network 10.

In embodiments of the present invention, the cloud access control server 30 communicates with the enterprise data network 10 to obtain network traffic information from the enterprise data network. In some embodiments, the cloud access control server 30 communicates with the web proxy 14 of the enterprise data network 10 using ICAP. The cloud access control server 30 includes an ICAP server 32 and a policy engine 43. The web proxy 14 of the enterprise data network 10 acts as an ICAP client and passes selective http(s) requests over ICAP to the ICAP server 32 of the cloud access control server 30. An http(s) request passed from the ICAP client to the ICAP server are encapsulated in an ICAP request message body. The ICAP server 32 receives the ICAP requests from the ICAP client (web proxy 14) and forwards the ICAP requests to the policy engine 34 for evaluation.

In embodiments of the present invention, the cloud access control server uses the ICAP communication protocol for enforcing access control. In the present description, ICAP refers to the Internet Content Adaption Protocol which is a lightweight HTTP-like protocol specified in RFC 3507 used to extend transparent proxy servers. ICAP is generally used to implement virus scanning and content filters (including censorware) in transparent HTTP proxy caches. Content Adaptation refers to performing the particular value added service (content manipulation) for the associated client request/response. ICAP concentrates on leveraging edge-based devices (caching proxies) to help deliver value-added services. At the core of this process is a cache that will proxy all network traffic and will process the network traffic through ICAP web servers. These ICAP servers are focused on a specific function, for example, advertisement insertion, virus scanning, content translation, language translation, or content filtering. Off-loading value-added services from web servers to ICAP servers allows those same web servers to be scaled according to raw HTTP throughput versus having to handle these extra tasks.

More specifically, ICAP operates based on an ICAP client communicating with an ICAP server. ICAP allows ICAP clients to pass HTTP messages to ICAP servers for some sort of transformation or other processing ("adaptation"). The ICAP server executes its transformation service on the messages and sends back responses to the ICAP client, usually with modified messages. Typically, the adapted messages are either HTTP requests or HTTP responses.

With the cloud access control server 30 thus configured, the enterprise data network 10 may utilize the cloud access control server 30 to implement access control policies for cloud services. In particular, the policy engine 34 applies access control policies or enforcement policies for the enterprise to the network traffic received by the ICAP server 32. The policy engine 34 generates policy enforcement results which are provided to the ICAP server 32 and transmitted back to the web proxy 14. The web proxy 14 takes measures in response to the policy enforcement results. For example, the policy enforcement results may include allow or deny of the http/https request from the network server. In other cases, the policy enforcement results may control the directionality of the network traffic, allowing downloading only but not uploading of data. In other cases, the policy enforcement results may provide for specific control, such as allowing or disallowing adding or editing of user accounts specific to certain types of cloud services.

The cloud access control server enables seamless integration of control policy into an enterprise's existing network infrastructure and does not require any changes in the enterprise network infrastructure to utilize the cloud access control server. More importantly, the cloud access control server does not alter the way the specific cloud services are accessed. The cloud access control is transparent to the users. In some cases, enterprises can start implementing the cloud access control policies for high-risk cloud-based services being used and then gradually extend the access control to other cloud based services.

Figure 2:
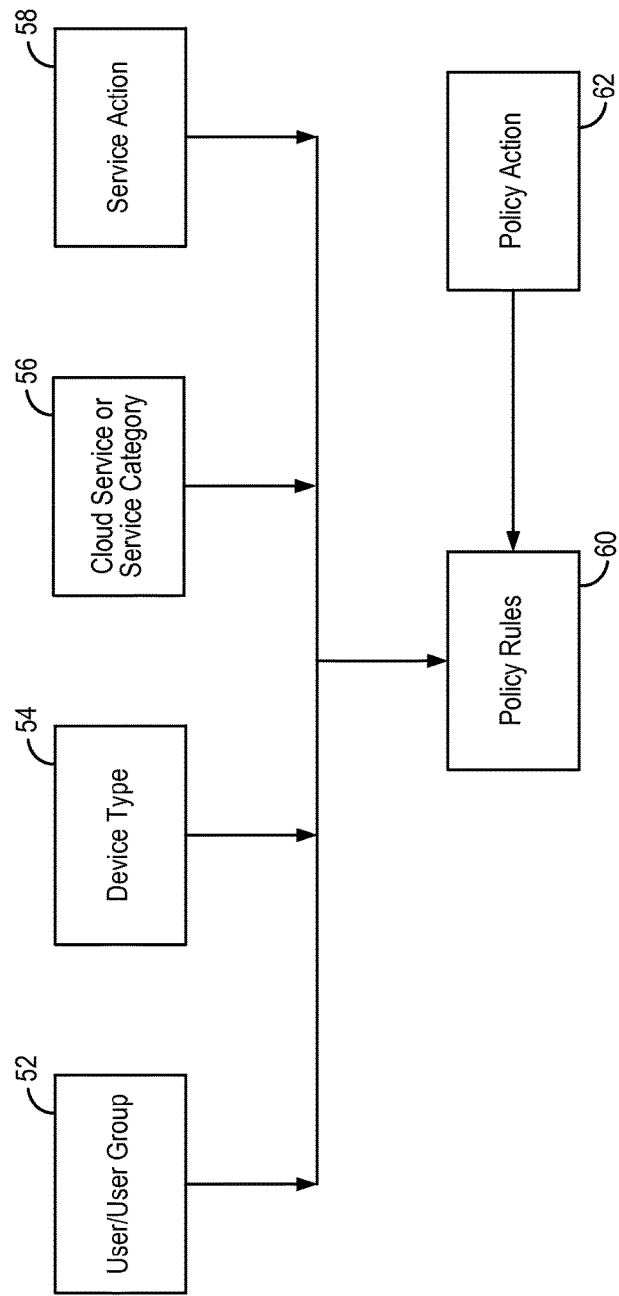
FIG. 2 illustrates the architecture of the policy engine of FIG. 1 in embodiments of the present invention.

In embodiments of the present invention, the policy engine 34 of the cloud access control server 30 implements access control policies that are divided into several groups. FIG. 2 illustrates the architecture of the policy engine 34 in embodiments of the present invention. Referring to FIG. 2, a first group 52 of access control policies concerns user or user group of the enterprise. The user/user group covers the end users in the enterprise who are accessing the cloud services. Access control policies can be created for a specific user or for a user group.

A second group 56 of access control policies concerns cloud service provider or the category of cloud service. A cloud service or a cloud service provider may be Box (www.box.com), or Dropbox (www.dropbox.com) or Salesforce (www.salesforce.com). Access control policies may be provided for one or more of the cloud service providers. Furthermore, access control policies may be provided for the service category, such as providers of file sharing services, providers of CRM (client relation management) services. Access control policies may be provided for one or more of the cloud service providers or for certain cloud service category. In some embodiments, each cloud service may be associated with a risk score generated and stored in a cloud service registry. Access control policies may be provided based on the risk score associated with the cloud service provider.

A third group 58 of access control policies concerns the service action requested by the user. For example, access control policies may be provided for the directionality of the service action, uploading files/data or downloading files/data. Access control policies may be provided for other types of service actions, such as actions that are specific to a cloud service provider or a cloud service category. For example, access control policies may be provided for service actions such as "creating or editing of account object" at a cloud provider (e.g. salesforce.com).

A fourth group 54 of access control policies concerns the device type being used to access the cloud services. The device type can include computing hardware, such as desktop computers or mobile devices, the operating system (Windows/Android/iOS) and the version of the operating system (Windows 6.x/Android 4.2/iOS 7.x).

For each access control policy 60, there is an associated policy action 62 that needs to be taken. The policy action may include allow or deny of the http access request, allow or deny based on the direction of the network traffic (upload versus download), controlling the cloud service usage rate, encrypting the data associated with the http request or providing warning messages.

In one example, an access control policy 60 can be provided as: If the user belongs to the user group 'employees-shortly-leaving', then block upload and download of documents from file sharing cloud service, such as Box.

In another example, an access control policy 60 can be provided as: If the user accesses "File Sharing" services from an Android device, then block download of documents.

In some cases, default access control policies may be used, which can be an implicit deny or allow of certain cloud services.

At the cloud access control server 30, the policy engine 34 evaluates the access control policies in the order they are defined. In one example, the policies are evaluated in the same manner as access control list for networks. The policy engine 34 will perform the policy action for the first policy match and generates the policy enforcement result to be sent to the web proxy 14. In particular, the policy enforcement results are first sent to the ICAP server 32, which sends a response to the ICAP request to the web proxy 14. For example, if the enforcement action is Block, then the ICAP server 32 sends an ICAP response with the 403 code (i.e. forbidden).

In embodiments of the present invention, the cloud access control server 30 is in communication with a policy server 40. The policy server 40 defines and stores access control policies. In some embodiments, the policy engine 34 receives the access control policies in real time from the policy server 40.

Figure 3:
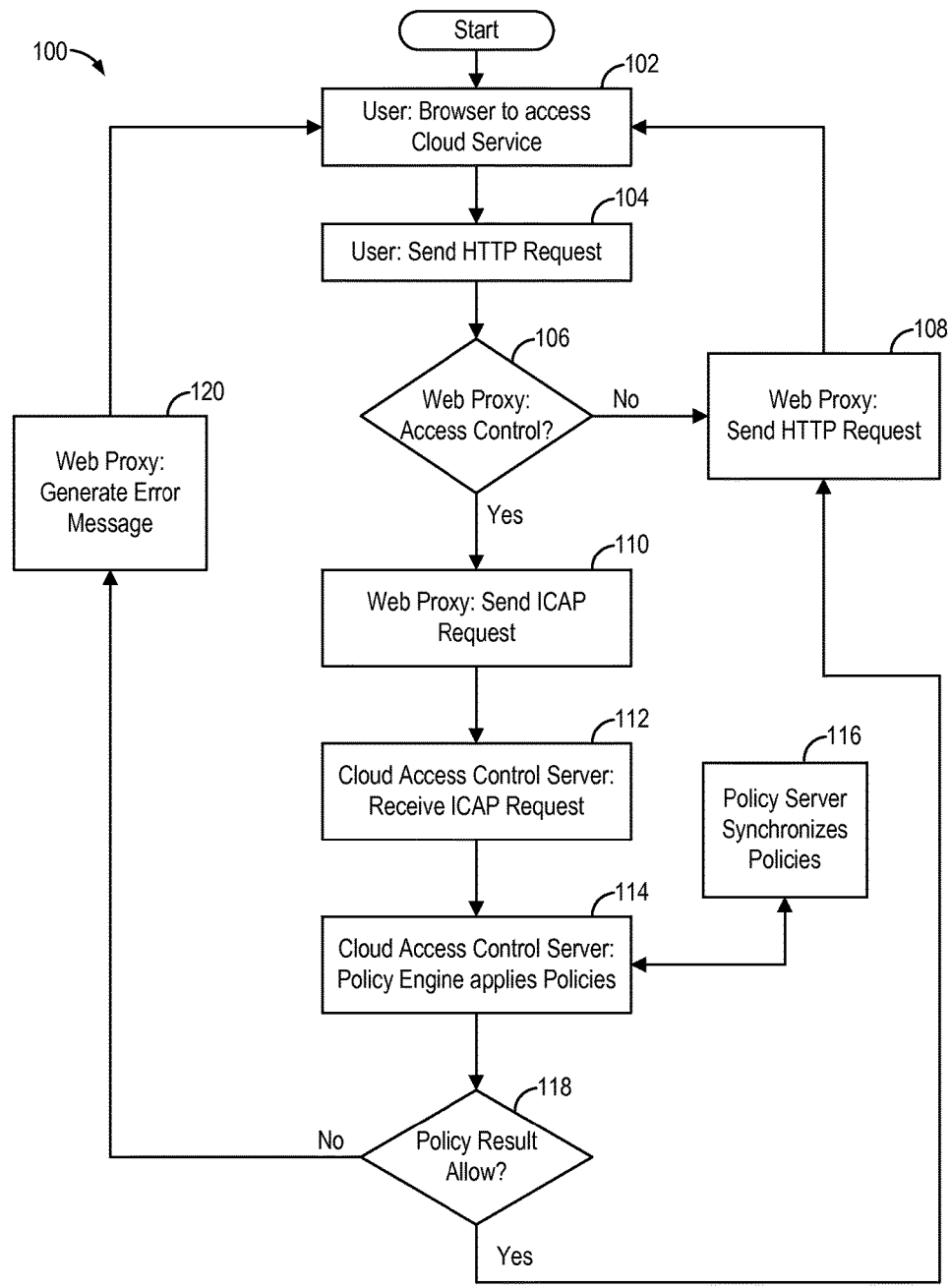
FIG. 3 is a flowchart illustrating a cloud access control method using the cloud access control server in embodiments of the present invention.

FIG. 3 is a flowchart illustrating a cloud access control method using the cloud access control server in embodiments of the present invention. It is assumed that the enterprise has configured access control policies that are stored on the policy server 40. The cloud access control method 100 of FIG. 3 will be discussed with reference to the block diagram of FIG. 1. First, a user uses a browser to access a cloud service (102). In practice, the user may use an application or a software program to access the cloud service. The user, through the application or program, generates a request for resource from the web browser (104). The request for resource is typically in the form of an http request message to a destination server for the server to provide resources such as HTML files and other content, or performs other functions on behalf of the requesting client—the browser used by the user. Under the HTTP protocol, the destination server, upon receiving the request for resource, will return a response message to the requesting client. In the present embodiment, the web browser sends the http request from the network server 12 of the enterprise data network 10 to the web proxy 14 of the enterprise data network 10. The http request reaches the web proxy 14 and the web proxy 14 determines if access control for the http request is required (106).

In the present embodiment, the web proxy 14 is configured in the ICAP Request Modification mode. Based on the configuration, the web proxy 14 determine if access control is required. In some situation, the web proxy 14 may determine that access control for the http request is not needed and the web proxy 14 sends the http request onward to the origin server associated with the http request (108). Alternately, the web proxy 14 may determine that access control for the http request is needed and sends an ICAP request message including the http request to the ICAP server 32 of the cloud access control server 30 (110). In some embodiments, the web proxy also sends additional user/user group information along with the ICAP request.

At the cloud access control server 30, the ICAP server 32 receives the ICAP request message and extracts information from the request (112). In one example, the ICAP server 32 extracts the destination server identification information. In another example, the ICAP server 32 extracts the destination server identification information as well as the following information from the ICAP request: the user/user group, cloud service/service category, service action, and device type. More specifically, the ICAP server 32 extracts information relating to the identification of a user or a user group as it relates to certain access control policy. The ICAP server 32 may further extract information relating to the identification of the cloud service or the service category associated with the desired cloud service. The ICAP server 32 may further extract information relating to the server action requested by the user, such as the directionality of the service action (e.g. uploading or downloading of files). The ICAP server 32 may further extract information relating to the device type being used to access the cloud service.

After obtaining the necessary information from the ICAP request message, the ICAP server 32 then invokes the Policy Engine 34 and the policy engine applies the access control policies and returns the policy enforcement result to the ICAP Server (114). In some embodiments, the policy engine 34 receives the access control policies in real time from the policy server 40 (116). The ICAP server 32 sends the ICAP response to the web proxy 14. If the policy enforcement result is "allow," then ICAP server sends an ICAP response with 'OK' (status code 200) status. If the policy enforcement result is "block," then ICAP server sends an ICAP response with 'FORBIDDEN' (status code 403) status.

The web proxy 14 receives the ICAP response (118). If the status is OK, then the web proxy 14 sends the http request to the origin server 45 associated with the http request (108). If the status is FORBIDDEN, then the web proxy sends an error message to the web browser of the user (120).

In other embodiments of the present invention, a cloud access control method for performing access control based on http responses can also be implemented. In this case, the web proxy 14 is configured in ICAP response modification mode to send http responses to the ICAP server 32. The ICAP server 32 extracts information relating to the http responses, such as the originating server, the service action and other information.

Figure 6:
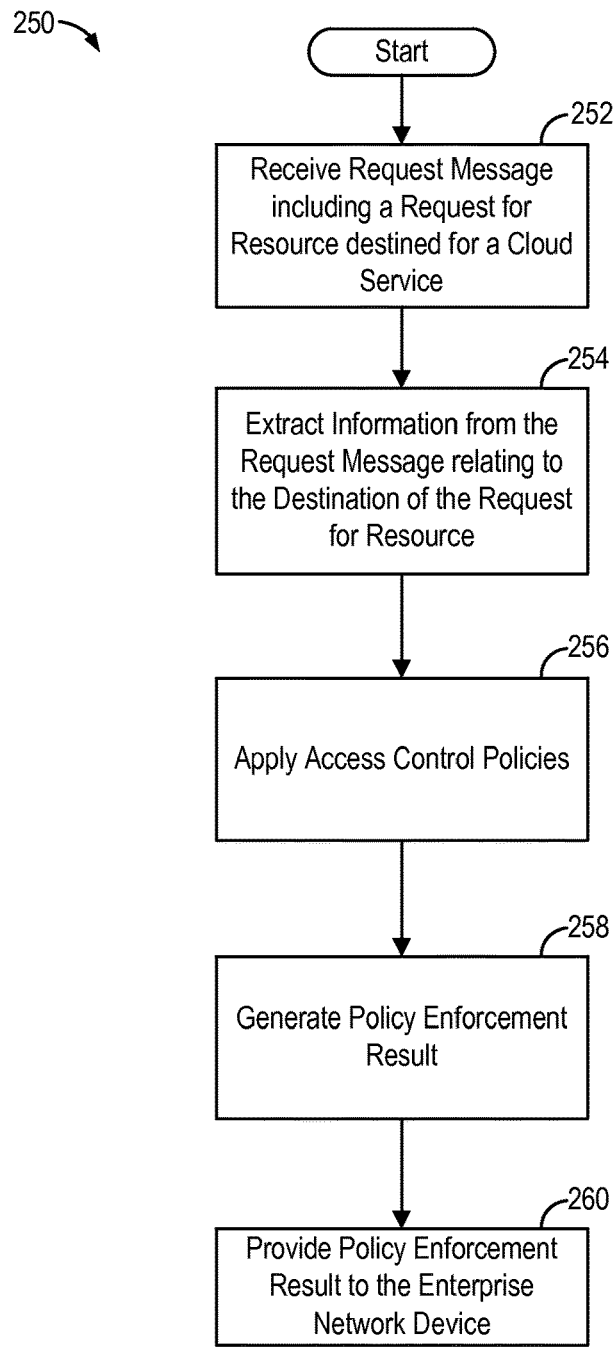
FIG. 6 is a flowchart illustrating a cloud access control method implemented at the cloud access control server in embodiments of the present invention.

FIG. 6 is a flowchart illustrating a cloud access control method implemented at the cloud access control server in embodiments of the present invention. Referring to FIG. 6, a cloud access control method 250 is implemented to provide cloud service access control to a network device of an enterprise data network. The method 250 starts by receiving, at a cloud access control server configured outside of the enterprise data network, a request message including a request for resource received at the network device and destined for a cloud service where the cloud service is configured outside of the enterprise data network (252). The method 250 then extracts information from the request message relating to the destination of the request for resource (254). The method 250 then applies one or more access control policies to the request for resource (256). The method 250 then generates a policy enforcement result in response to the application of the one or more access control policies to the request for resource where the policy enforcement result includes an instruction to allow or deny the request for resource (258). The method 250 then provides the policy enforcement result to the network device (260).

In some embodiments, the cloud access control server may be in communication with a cloud service registry. The cloud service registry may be used to store information associated with the group of cloud service providers and their associated provider risk scores. The provider risk scores can be assessed by analysis of the properties of the cloud service providers. In some embodiments, the cloud service registry is used to store cloud service provider information gathered via multiple means in both human and machine readable form. For example, cloud service provider information may be obtained from multiple sources including, but not limited to, the service provider itself, the users of the cloud service, web crawling, crowd-sourced information, etc. In some embodiments, the provider information is collected on a continuous real-time basis and the provider information stored in the cloud service registry is dynamically updated to ensure that the most-up-to-date information concerning the cloud service providers is gathered in the registry.

With the cloud service provider information thus obtained, a risk assessment system may be used to analyze the risk associated with using the services for each of the cloud service providers. In some embodiments, the risk assessment system may be in communication with the cloud service registry to analyze the cloud service provider information stored therein to assess the risk level for each cloud service provider. In some embodiments, the risk assessment system generates a provider risk score for each cloud service provider based on values for the set of attributes gathered for the provider and stored in the cloud service registry. The provider risk score may also be stored in the cloud service registry and used by the cloud access control server to implement access control policies.

In other embodiments of the present invention, a cloud access control server and method provides a cloud service access control database to implement cloud services access control policy. The cloud service access control database stores thereon cloud service identifiers associated with cloud service providers having risk scores above a given threshold indicating the cloud service providers should be blocked from access by one or more enterprises. In embodiments of the present invention, the cloud service identifiers form a block list of cloud services which should be denied for access by the enterprises.

Figure 4:
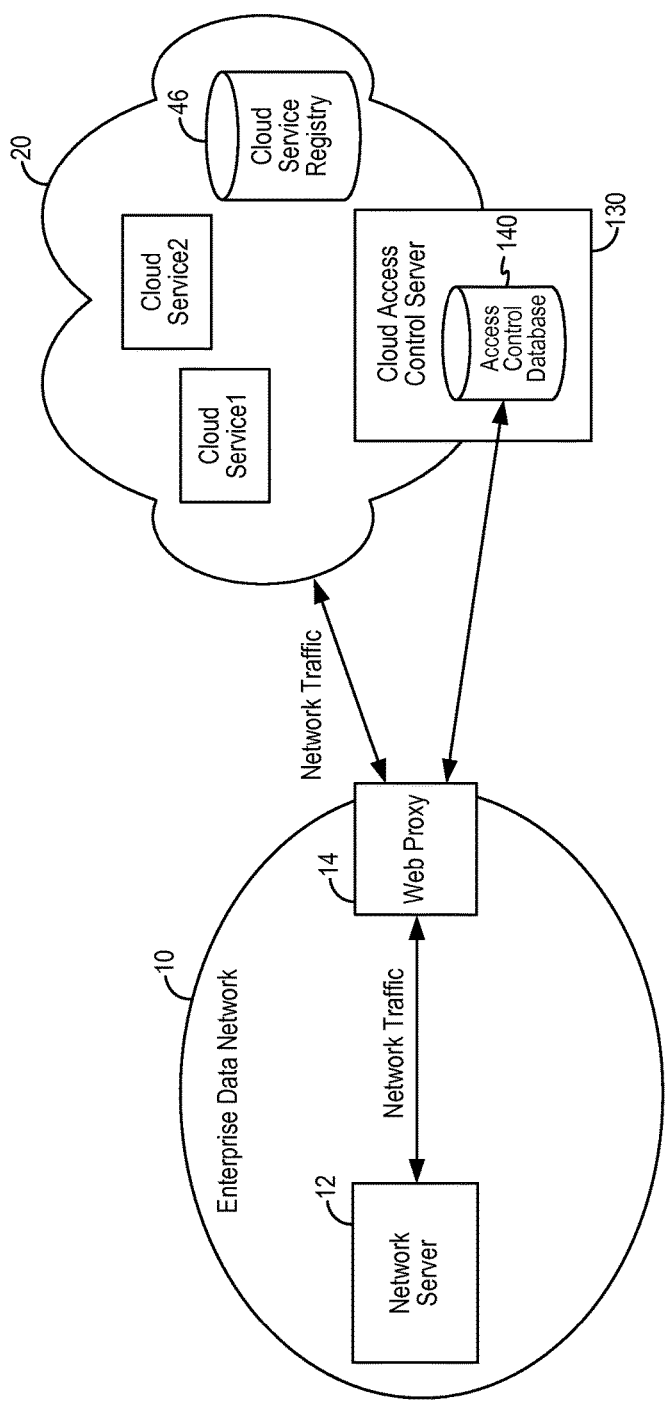
FIG. 4 is a diagram illustrating an environment in which the cloud access control server of the present invention can be deployed in some embodiments.

FIG. 4 is a diagram illustrating an environment in which the cloud access control server of the present invention can be deployed in some embodiments. Referring to FIG. 4, an enterprise may operate an enterprise data network 10 including one or more network servers 12. The enterprise data network 10 includes an enterprise network edge 14, such as a proxy server or a web proxy, which is used to communicate with a public data network 20, such as the publicly accessible Internet. In the present description, a web proxy refers to a proxy server or a gateway that acts as an intermediary for http(s) requests. Users of the enterprise, wishing to access a website outside of the enterprise's data network 10, communicate with the web proxy 14 through the network server 12 using a web browser.

The enterprise or users of the enterprise data network 10 may wish to use one or more cloud services provided by cloud service providers, such as Cloud Service Provider 1. Network traffic form the network server 12 travels to the web proxy 14 and then onto the cloud service providers. For example, users of the enterprise may upload data files or other data content to be stored on one or more cloud services on the public data network 20.

At the enterprise data network 10, the web proxy 14 acts as an intermediary for the entire http/https traffic flowing from the enterprise (network server 12) to an outside data network, such as the public Internet. The enterprise usually includes the web proxy 14 for network tasks such as caching, malware analysis etc. The web proxy also communicates with the enterprise administrator for authentication.

In embodiments of the present invention, a cloud access control server 130 maintains a cloud service access control database 140 to implement cloud services access control policy. The cloud service access control database stores thereon cloud service identifiers associated with cloud service providers having risk scores above a given threshold indicating the cloud service providers should be blocked from access by one or more enterprises. In embodiments of the present invention, the cloud service identifiers form a block list of cloud services which should be denied for access by the enterprises.

Accordingly, a network device, such as a security appliance, deployed in an enterprise data network accesses the cloud service access control database 140 to obtain the block list of cloud service provider identifiers. The cloud service provider identifiers are stored in a local registry of the network device and used by the network device to implement access control, such as to block the cloud service identified by the cloud service provider identifiers. In some embodiments, the network device may be a firewall or a web proxy of an enterprise, such as web proxy 14, deployed to implement access control policies or security policies for the enterprise.

In some embodiments, the cloud service identifiers stored in the database include the universal resource locators (URLs) of the cloud service providers. The cloud access control server and method stores the URLs of cloud service providers having a risk score above the given threshold in the database. In some embodiments, the list of URLs forms an URL block list containing URLs of cloud service providers whose services should be blocked. In operation, the network device may make call to the cloud service access control database to obtain the URL block list for cloud services to be blocked. The network device can then store the URLs in its local registry and apply control policy based on the URLs.

In other embodiments, the cloud access control server 130 is in communication with the cloud service registry 46 and has access to the cloud service risk scores data stored thereon. The cloud access control server evaluates the risk scores associated with the cloud service providers. In some embodiments, the cloud access control server identifies cloud service providers with a risk score above a given threshold. The cloud access control server then compile a list of URLs associated with the cloud service providers having the higher-than-threshold risk scores and store the URLs in the cloud service access control database, the list of URLs forming the URL block list. In some embodiments, the cloud service access control database is updated dynamically. For example, the cloud access control server may update the database periodically, such as every hour.

A network device wishing to obtain information for control policy implementation may access the database periodically to pull the URL block list from the database. In this manner, the control policy implemented by the network device is dynamically updated as well. In this manner, the network device deployed at the enterprise data network has the up-to-date information to block cloud services that have been rated with a high risk score.

In other embodiments, the cloud access control server maintains in the database multiple URL block lists associated with different level of risk scores or different service category of the cloud service providers. An enterprise may access the database to obtain the URL block list associated with the risk score threshold it desires to block or the service category it desires to block. In this manner, the cloud access control server provides the desire level of access control policy for each enterprise.

Figure 5:
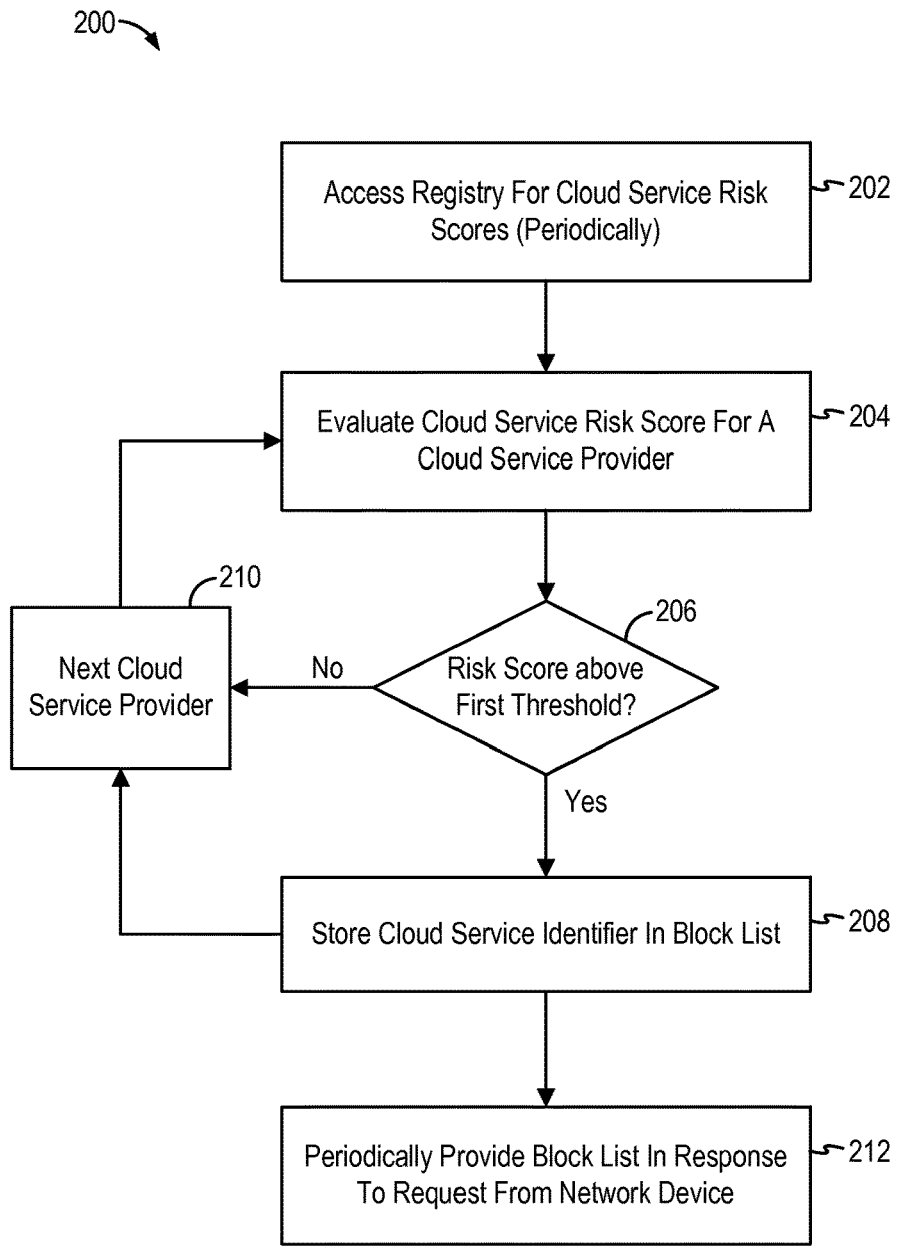
FIG. 5 is a flowchart illustrating a cloud access control method in embodiments of the present invention.

FIG. 5 is a flowchart illustrating a cloud access control method in embodiments of the present invention. Referring to FIG. 5, a cloud access control method 200 starts by accessing the cloud service registry for cloud service risk scores (202). The method then evaluates cloud service risk score for a cloud service provider (204). The method compares the risk score to a first threshold (206). In response to the risk score being above the first threshold, the method stores the cloud service identifier in a block list (208). The method provides the block list in response to requests from a network device (212). The block list may be provided periodically.

In response to the cloud service risk score of the cloud service provider being less than the first threshold, the method continues to select the next cloud service provider (210) to evaluate the cloud service risk score (204).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of implementing cloud service access control in a network device associated with an enterprise data network, comprising:

receiving, by a cloud access control server that includes a hardware processor and that is outside of the enterprise data network, on a periodic basis, information relating to a plurality of cloud service providers and risk scores indicative of risk associated with the plurality of cloud service providers;

storing, at a cloud service access control database associated with the cloud access control server, a first cloud service block list, the first cloud service block list comprising first cloud service identifiers associated with a first set of two or more of the plurality of cloud service providers, wherein the risk scores of the first set of two or more of the plurality of cloud service providers are above a given threshold;

providing the first cloud service block list to the network device of the enterprise data network, the network device applying the first cloud service block list to allow or deny network traffic between the enterprise data network and at least one of the first set of two or more of the plurality of cloud service providers; and storing a second cloud service block list, the second cloud service block list comprising second cloud service identifiers associated with a second set of two or more of the plurality of cloud service providers, wherein storing, at the cloud service access control database associated with the cloud access control server, the first cloud service block list comprises storing universal resource locators (URLs) of the first set of two or more of the plurality of cloud service providers as the cloud service identifiers associated with the first set of two or more of the plurality of cloud service providers having the risk scores above the given threshold, and wherein the first set of two or more of the plurality of cloud service providers and the second set of two or more of the plurality of cloud service providers belong to different service categories.

2. The method of claim 1, wherein providing the first cloud service block list to the network device of the enterprise data network comprises providing the first cloud service block list to a web proxy, a proxy server or a gateway of the enterprise data network.

3. The method of claim 1, further comprising:
receiving a request for the first cloud service block list from the network device of the enterprise data network; and
in response to the request from the network device, providing the first cloud service block list to the network device of the enterprise data network.

4. The method of claim 1, further comprising:
in response to receiving the information relating to the plurality of cloud service providers and the risk scores indicative of risk associated with the plurality of cloud service providers, evaluating the risk scores to assess which of the risk scores of the plurality of cloud service providers are above the given threshold.

5. A system for providing cloud service access control to a network device of an enterprise data network, comprising:

a cloud access control server that includes a hardware processor and that is configured outside of the enterprise data network, the cloud access control server being configured to receive information relating to a plurality of cloud service providers and risk scores indicative of risk associated with the plurality of cloud service providers, to store in a cloud service access control database a first cloud service block list, the first cloud service block list comprising first cloud service identifiers associated with a first set of two or more of the plurality of cloud service providers, wherein the risk scores of the first set of two or more of the plurality of cloud service providers are above a given threshold, and to provide the first cloud service block list to the network device of the enterprise data network, wherein the network device applies the first cloud service block list to allow or deny network traffic between the enterprise data network and at least one of the first set of two or more of the plurality of cloud service providers, wherein the cloud service identifiers in the first cloud service block list comprise universal resource locators (URLs) of the first set of two or more of the plurality of cloud service providers, wherein the cloud access control server is further configured to store in a cloud service access control database a second cloud service block list including second cloud service identifiers associated with a second set of two or more of the plurality of cloud service providers, and wherein the first set of two or more of the plurality of cloud service providers and the second set of two or more of the plurality of cloud service providers belong to different service categories.

6. The system of claim 5, wherein the network device of the enterprise data network comprises a web proxy, a proxy server or a gateway of the enterprise data network.

7. The system of claim 5, wherein the cloud access control server is further configured to receive a request for the first cloud service block list from the network device of the enterprise data network and to provide the first cloud service block list to the network device of the enterprise data network in response to the request from the network device.

8. The system of claim 5, wherein the cloud access control server is further configured to evaluate the risk scores to assess which of the risk scores of the plurality of cloud service providers are above the given threshold in response to receiving the information relating to the plurality of cloud service providers and the risk scores indicative of risk associated with the plurality of cloud service providers.

* * * * *